Oct. 5, 1943.  H. O. PETERSON  2,331,136
TRANSMISSION LINE SEAL AND INSULATOR
Filed Dec. 23, 1939

Inventor
Harold O. Peterson,
By H. G. Grover
Attorney

Patented Oct. 5, 1943

2,331,136

UNITED STATES PATENT OFFICE 2,331,136

TRANSMISSION LINE SEAL AND INSULATOR

Harold O. Peterson, Riverhead, N. Y., assignor to Radio Corporation of America, a corporation of Delaware Application December 23, 1939, Serial No. 310,807

10 Claims. (Cl. 174—22)

This invention relates to a new and novel transmission line seal.

An object of this invention is to simplify and improve transmission lines generally in order to provide a combined transmission line seal and insulator which will reduce brushing by having a minimum amount of metal and solid dielectric in the active electric field.

Another object is to provide a transmission line seal which will not cause reflections and standing waves when the line is used to transmit high frequency energy.

Still another object of this invention is to improve a transmission line coupling or terminating seal which is suitable for use in transmission lines of the coaxial type.

A feature of this invention is the novel combination of an insulating and a gas-tight sealing member to space the inner conductor concentric with the outer conductor and to completely seal the line from fluid leakage.

Coaxial transmission lines are generally operated in such a manner as to have an internal gas pressure greater than atmospheric pressure or outside hydrostatic pressure so that if there are any small leaks in the system, gas will slowly escape rather than have a condition of moist air or water being forced into the line. Dry nitrogen is commonly used in these lines but any inert dry gas is generally satisfactory. At the ends of the line it is generally necessary to provide a termination for connecting the transmission line with apparatus operating at atmospheric pressure and, consequently, a gas-tight seal may be provided to prevent escape of gas from the line. Many of the seals commonly used in practice have such large capacity that they are not satisfactory for operation at ultra-high frequencies. This invention provides a seal with good insulating qualities and a very small electrical capacity, also, the design is such that good mechanical strength is obtained.

This invention will best be understood by referring to the accompanying drawing, in which.

Figure 1:
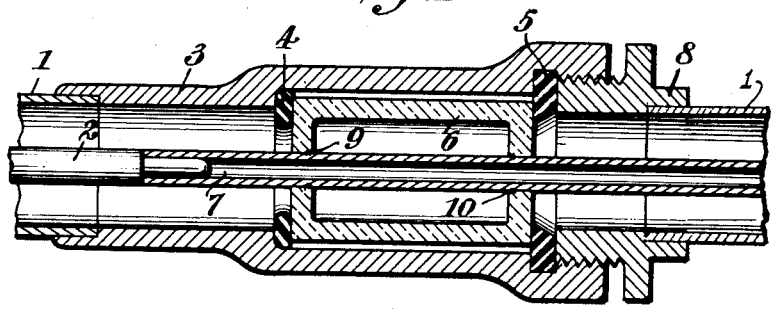
Fig. 1 is a longitudinal section of an all glass seal and insulator of this invention.
Figure 2:
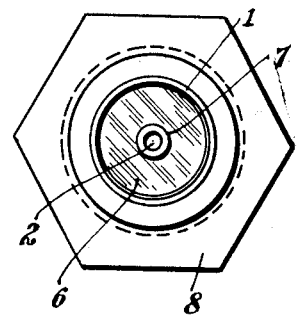
Fig. 2 is an end elevation of Fig. 1.

Referring now in detail to the drawing, Figs. 1 and 2 show a seal applied to the end of a concentric line which consists of an inner conductor 2 and an outer concentric conductor 1. The outer conductor 1 is generally in the form of a metallic pipe and is soldered to a female fitting 3 which may be of brass or other suitable metal having good electrical conductivity. The inner conductor 2 is soldered to a piece of thin tubing 7 which has the same outside diameter as conductor 2. This tubing may be of Fernico or other suitable metal, such that it can be bonded with a cylindrical glass insulating member 6 which is in the form of a cylindrical tube with the ends closed down to a smaller diameter and bonded to the metal tubing 7 at points 9 and 10. This bonding is the usual type of glass-to-metal seal commonly used in vacuum tube practice in which the immediate contact area of the glass is heated to a temperature gradient sufficient to wet the metal tube 7.

At each end of the cylindrical glass insulating member there is located gas-tight gaskets 4 and 5 which may be of rubber or other suitable material. The necessary compression to make gaskets 4 and 5 fluid-tight is obtained by tightening the threaded hex nut 8, which is also preferably made of brass. Thus, with the gas-tight gaskets 4 and 5 and the glass-to-metal seals 9 and 10, the gas pressure in the concentric line is retained by a double set of gas-tight barriers. Because of the fact that the metal conductor 7 is supported at two points, a good degree of mechanical strength will also be realized. By keeping the wall thickness of the insulating member 6 substantially less than its radius the amount of solid dielectric in the active electric field is greatly reduced and therefore reduces dielectric losses in the transmission line.

Figure 3:
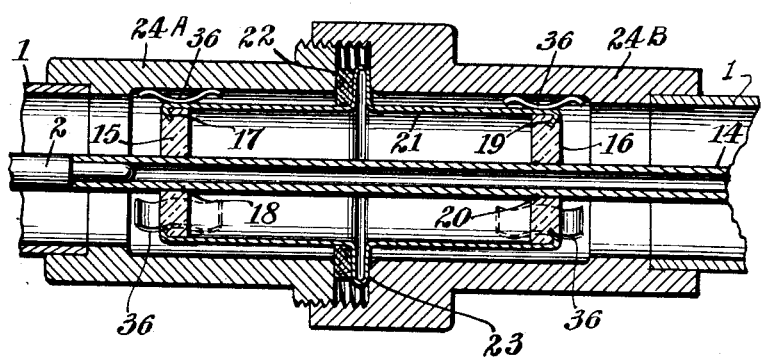
Fig. 3 is a longitudinal section of a combined glass and metal seal.
Figure 4:
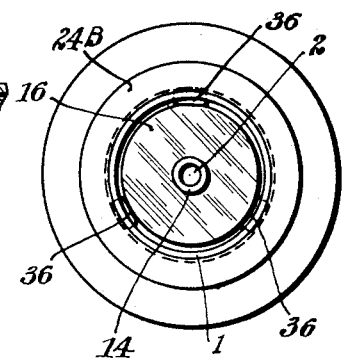
Fig. 4 is an end elevation of Fig. 3.

The seal shown by Figs. 3 and 4 is generally similar to that shown in Figs. 1 and 2, except in this case, the insulating member includes two glass discs 15 and 16 which are sealed to an inner conductor 14 at points 18 and 20 and to an outer cylinder 21, of metal, at points 17 and 19. At the central portion of member 21, a flange 23 is provided so that the sealing device can be clamped with suitable packing material at 22 so as to complete the gas-tight seal. The packing material 22 is clamped between male and female fittings 24a and 24b, respectively. It will also be desirable at very high frequencies to make electrical contact between the outside of the outer metal shell of the seal and the inside of the outer conductor of the line. To accomplish this, there is provided a plurality of metal spring contact members 36 which are secured to member 21 to contact the inside of members 24A and 24B.

Figure 5:
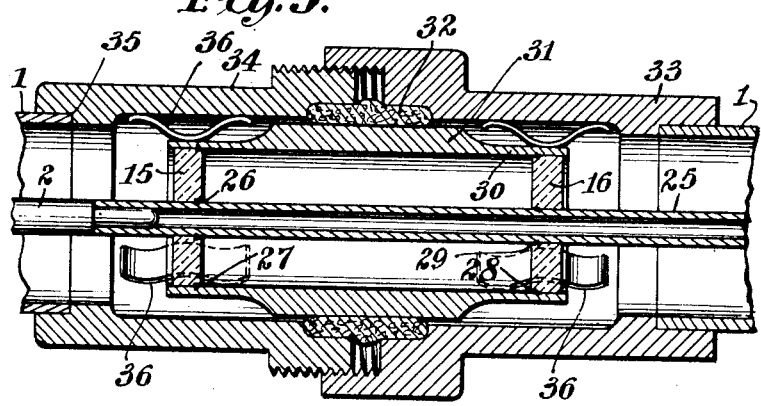
Fig. 5 is a longitudinal section of a modification of the seal shown in Figs. 3 and 4.
Figure 6:
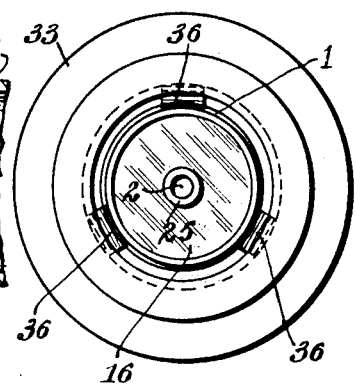
Fig. 6 is an end elevation of Fig. 5.

In the other embodiment shown by Figs. 5 and 6, the insulating member includes an inner conductor tube 25 which is sealed to glass discs 15 and 16 at points 26 and 29. These discs are likewise sealed to an outer cylindrical member 30, also of metal, at points 27 and 28. This outer cylinder is thickened at one or more points, such as, for instance, at 31, to allow it to be firmly clamped in a gas-tight compression seal by clamping the gasket 32 between the female fitting 33 and the male fitting 34, the latter being soldered to the outer conductor 1 at point 35. A plurality of spring members 36 are secured to tube 30 by any suitable means, such as for example by welding, and make contact with the inside of members 33 and 34.

The inner conductors, shown as members 7, 14 and 25, may be of any suitable metallic tubing and copper or silver plated to improve their conductivity at radio frequencies. The insulation discs shown as members 15 and 16 are preferably made of inorganic material, but this material need not necessarily be that of glass. For example, a platinized porcelain disc might be used which is platinized at outer and inner circumferences, in which case it would be possible to solder the disc into the metal cylinder and also to the inner conductor. Members 8, 24b and 33 may connect to suitable terminal means or join another length of inner and outer conductors.

Although only a few embodiments of this invention is shown, it is to be distinctly understood that it should not be limited precisely thereto.

What is claimed is:

1. A radio frequency transmission line having inner and outer conductors concentrically arranged with a fluid-tight seal in combination with a hollow cylindrical insulating member secured and sealed to a metallic tube forming a portion of the inner conductor of said line, said cylindrical insulating member having a wall thickness which is substantially less than its radius, clamping means for joining two portions of the outer conductor of said line together, and a fluid-tight gasket interposed between each one of the outside ends of said insulating member and portons of said clamping means.

2. A radio frequency transmission line having an inner and an outer conductor concentrically arranged with a fluid-tight seal in combination with a hollow cylindrical insulating member secured and sealed to a metallic tube forming a portion of the inner conductor of said line, said cylindrical member having a wall thickness which is substantially less than its radius, coupling means including two portions for joining two portions of the outside conductor of said line together, and a fluid-tight gasket interposed between each one of the outside ends of said insulating member and portions of said coupling means, at least one portion of said coupling means having threads which engage the other portion of said coupling means for clamping said insulating member and gaskets together.

3. A radio frequency transmission line comprising an inner and an outer conductor, a fluid-tight seal including a fluid-tight hollow cylindrical insulating member secured and sealed to a metallic tube which forms a portion of said inner conductor, said cylindrical member having a wall thickness which is substantially less than its radius, clamping means for joining two portions of said outer conductor together, said clamping means having two inner shoulder portions, and a fluid-tight gasket bearing against the outside of each one of the ends of said cylindrical insulating member and each one of the inner shoulder portions of said clamping means.

4. A radio frequency concentric line comprising an inner and an outer conductor, a coupling member including at least two portions for joining two portions of said outer conductor together, one of the portions of said coupling member having two shoulder portions and a threaded end, the other portion of said coupling member having threads to engage the threaded end of said first mentioned portion of said coupling member, a hollow cylindrical insulating member of inorganic material having its end walls secured to and sealed to a metallic tube which forms a portion of the inner conductor, and a gasket located at each one of the ends of said insulating member and arranged to be clamped at each one of the shoulder portions of the first mentioned portion of said coupling member and sealed by pressure applied by said second mentioned portion of the coupling member.

5. A high frequency concentric line including an inner and an outer conductor, a fluid-tight seal in the form of a hollow cylindrical insulating member, a metallic tubular member secured and sealed to the ends of said insulating member at the axis thereof, said tubular member adapted to form a portion of the inner conductor, clamping means for joining two portions of the outer conductor of said line together, and a fluid-tight gasket interposed between each one of the outside ends of said insulating member and said clamping means.

6. A radio frequency transmission line having an inner and an outer conductor concentrically arranged, a fluid-tight seal in the form of a hollow cylindrical insulating member of glass, a metallic tube secured and sealed to the ends of said insulating member at the axis thereof, said metallic tube electrically connected to a portion of the inner conductor and forming a portion thereof, clamping means for joining two portions of the outer conductor of said line together, and a fluid-tight gasket interposed between each one of the outside ends of said insulating member and said clamping means.

7. A radio frequency transmission line comprising an inner and an outer conductor concentrically arranged, a fluid-tight seal in the form of a hollow insulating member of porcelain, a metallic tube sealed to said insulating member at the axis thereof and forming a portion of the inner conductor and electrically connected thereto, clamping means for joining two portions of the inner and outer conductors together, and a fluid-tight gasket interposed between each one of the outside ends of said insulating member and said clamping means.

8. A transmission line insulator for concentrically spacing the inner and outer conductors of said line comprising a hollow cylindrical glass member, a metallic tube forming a portion of the inner conductor, said hollow cylindrical glass member having a wall thickness substantially less than its radius, said cylindrical glass member sealed to said metallic tube by a wetted joint therebetween, coupling means for joining two portions of the outer conductor together, a fluid-tight gasket interposed between the ends of said cylindrical glass member and shouldered portions on said coupling means.

9. A radio frequency transmission line having inner and outer conductors concentrically arranged with a fluid-tight seal in combination with a hollow cylindrical insulating member secured and sealed to a metallic tube forming a portion of the inner conductor of said line, said cylindrical insulating member having a wall thickness which is substantially less than its radius, terminal means for connecting to an end of the outer conductor of said line, and a fluid-tight gasket interposed between each one of the outside ends of said insulating member and portions of said terminal means.

10. A radio frequency transmission line having an inner and an outer conductor concentrically arranged with a fluid-tight seal in combination with a hollow cylindrical insulating member secured and sealed to a metallic tube forming a portion of the inner conductor of said line, said cylindrical member having a wall thickness which is substantially less than its radius, terminal means, including two portions, for connecting to an end of the outside conductor of said line, and a fluid-tight gasket interposed between each one of the outside ends of said insulating member and portions of said terminal means, at least one portion of said terminal means having threads which engage the other portion of said terminal means for clamping said insulating member and gaskets together.

HAROLD O. PETERSON.